(12) United States Patent
Arikawa et al.

(10) Patent No.: US 10,432,318 B2
(45) Date of Patent: Oct. 1, 2019

(54) DIGITAL SIGNAL PROCESSING CIRCUIT AND OPTICAL SPACE COMMUNICATION SYSTEM

(71) Applicant: NEC CORPORATION, Tokyo (JP)

(72) Inventors: Manabu Arikawa, Tokyo (JP); Toshiharu Ito, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/066,854

(22) PCT Filed: Jan. 10, 2017

(86) PCT No.: PCT/JP2017/000388
§ 371 (c)(1),
(2) Date: Jun. 28, 2018

(87) PCT Pub. No.: WO2017/122605
PCT Pub. Date: Jul. 20, 2017

(65) Prior Publication Data
US 2019/0013875 A1 Jan. 10, 2019

(30) Foreign Application Priority Data
Jan. 13, 2016 (JP) .................................. 2016-004487

(51) Int. Cl.
*H04B 10/06* (2006.01)
*H04B 10/61* (2013.01)
(Continued)

(52) U.S. Cl.
CPC ....... *H04B 10/6165* (2013.01); *H04B 10/118* (2013.01); *H04B 10/1121* (2013.01); *H04L 27/063* (2013.01); *H04L 27/22* (2013.01)

(58) Field of Classification Search
CPC ... H04B 10/112; H04B 10/114; H04B 10/116; H04B 10/6165; H04B 10/6163;
(Continued)

(56) References Cited

U.S. PATENT DOCUMENTS

2011/0255877 A1 10/2011 Nakashima et al.
2014/0044434 A1 2/2014 Hashimoto
(Continued)

FOREIGN PATENT DOCUMENTS

JP 2011-228819 A 11/2011
WO 2012/132374 A1 10/2012

OTHER PUBLICATIONS

Andreas Leven, et al., "Frequency Estimation in Intradyne Reception", IEEE Photonics Technology Letters, Mar. 15, 2007, pp. 366 to 368, vol. 19, No. 6.
(Continued)

*Primary Examiner* — Hanh Phan
(74) *Attorney, Agent, or Firm* — Sughrue Mion, PLLC

(57) ABSTRACT

In order to increase a compensation range for Doppler shift compensation, this digital signal processing circuit is provided with a Doppler shift compensation unit which, on the basis of a sample sequence signal which is oversampled at N (where N is an integer at least equal to 2) times a symbol rate and includes a central sample corresponding to the timing at a symbol center, and a transition sample corresponding to the timing of a symbol transition, finds a Doppler shift amount included in the sample sequence signal and performs Doppler shift compensation. The Doppler shift compensation unit includes a symbol determining unit which performs a symbol determination with respect to the central sample and a determination with respect to the transition sample. The Doppler shift compensation unit switches between these determinations for each correspond-
(Continued)

ing sample and performs said determinations in order to obtain a phase difference and thereby detect the Doppler shift amount.

9 Claims, 14 Drawing Sheets

(51) Int. Cl.
  *H04B 10/112* (2013.01)
  *H04B 10/118* (2013.01)
  *H04L 27/22* (2006.01)
  *H04L 27/06* (2006.01)

(58) Field of Classification Search
  CPC .. H04B 10/6164; H04B 10/616; H04B 10/61; H04B 10/118
  USPC ....... 398/118, 119, 120, 122, 124, 125, 126, 398/127, 128, 130, 135, 136, 202, 204, 398/205, 208, 209, 158, 159, 183, 188
  See application file for complete search history.

(56) References Cited

U.S. PATENT DOCUMENTS

2014/0356003 A1* 12/2014 Randel ............... H04B 10/6161
  398/210
2016/0094297 A1* 3/2016 Xie ...................... H04B 10/616
  398/202

OTHER PUBLICATIONS

P.J. Winzer, et al., "Spectrally Efficient Long-Haul Optical Networking Using 112-Gb/s Polarization-Multiplexed 16-QAM", Journal of Light wave Technology, Feb. 15, 2010, pp. 547 to 556, vol. 28, No. 4.

International Search Report for PCT/JP2017/000388 dated Feb. 14, 2017 [PCT/ISA/210].

* cited by examiner

FIG. 11

DIGITAL SIGNAL PROCESSING CIRCUIT AND OPTICAL SPACE COMMUNICATION SYSTEM

CROSS REFERENCE TO RELATED APPLICATIONS

This application is a National Stage of International Application No. PCT/JP2017/000388 filed 2016-004487, claiming priority based on Japanese Patent Application No. 2016-004487 filed Jan. 13, 2016, the entire disclosure of which is incorporated herein by reference.

TECHNICAL FIELD

The present invention relates to a digital signal processing circuit to compensate a Doppler shift in signal light frequency in an optical space communication system that provides connection between satellites or between a satellite and the ground and relates to an optical space communication system.

BACKGROUND ART

The development of data processing techniques in recent years has prompted studies on the extraction of significant information from among earth observation data (to be referred to simply as observation data hereinafter) acquired by satellites, airplanes, and the like (to be referred to as flying objects hereinafter as appropriate) and the use of such information for disaster prevention, resource exploration, and the like.

At the same time, the improvement in the power of resolution of earth observation sensors and the growing amount of observation data have led to an increased demand for greater transmission capacity for transmitting acquired observation data to the ground.

Methods for sending observation data to the ground can be roughly grouped into those in which a flying object communicates directly with a terrestrial station and those in which a flying object transmits data to a terrestrial station via a geostationary orbit satellite, which is accessible at all times from the terrestrial station. In the direct communication methods, however, the communication between a flying object and a terrestrial station is possible only when the terrestrial station can be directly seen from the terrestrial station as the flying object travels at a high speed.

In any of the methods, however, available bands for microwave communication are heavily limited, which is disadvantageous. Thus, optical space communication systems are drawing attention as they are not bound by band restriction and can be operated with greater capacity.

For fiber-optic communication systems, when looked at from such a viewpoint, digital coherent technology, which combines coherent detection and digital signal processing, is worthy of attention. The coherent detection technology features a high reception sensitivity achieved in a phase shift keying method by the interference of very weak received optical signals with local oscillator signals.

However, as the flying object travels at a high speed, a Doppler shift occurs in the signal light. Thus, to achieve a high sensitivity reception with a phase shift keying method, it is necessary to remove the effect of Doppler shift. In other words, the range of compensation for the relative frequency difference between the carrier frequency of the signal light and the frequency of the local oscillator signal has to be expanded to the amount of Doppler shift that occurs.

With respect to the digital coherent technology, several techniques have been proposed for compensating for the relative frequency difference between the carrier frequency of the signal light and the frequency of the local oscillator signal (i.e., frequency offset) by digital signal processing.

According to NPL 1, for example, with respect to a QPSK (quadrature phase shift keying) signal, the phase difference between two consecutive samples received is raised to the power of four to remove the effects of data modulation and then averaged to reduce the effect of noise. Then the phase difference between the consecutive samples is calculated, which corresponds to the frequency offset.

NPL 2 proposes a decision-directed phase locked loop (DDPLL). The DDPLL calculates a phase error by initially performing a symbol decision with respect to the received sample and performs feedback control based on the phase error.

FIG. 16 is a common block diagram of such a DDPLL. The DDPLL 100 includes a phase adjustment device 101, a phase error calculation circuit 102, a loop filter 103, and a voltage-controlled oscillator (VCO) 104.

The phase error calculation circuit 102 includes a symbol decision unit 102a, a complex conjugate unit 102b, a multiplication device 102c, and an argument calculation unit 102d.

A 1-sample/symbol signal (sample) G1 sampled at the timing of a symbol center is inputted to the phase adjustment device 101, phase-adjusted and outputted by the phase adjustment device 101, and inputted to the phase error calculation circuit 102.

The phase error calculation circuit 102 selects a most probable symbol decision candidate for each sample and the complex conjugate unit 102b calculates a complex conjugate for the result of the selection. The complex conjugate so calculated is multiplied by the original sample in the multiplication device 102c and the argument calculation unit 102d calculates an argument. This argument is inputted to the phase adjustment device 101 via the loop filter 103 and the VCO 104, as a phase compensation signal G2.

The phase adjustment device 101 compensates for the Doppler shift contained in the sample using the phase compensation signal G2.

CITATION LIST

Non Patent Literature

[NPL 1] A. Leven et al., "Frequency Estimation in Intradyne Reception," IEEE Photon. Technol. Lett., Vol. 19, No. 6, 366 (2007).

[NPL 2] P. J. Winzer et al., "Spectrally Efficient Long-Haul Optical Networking Using 112-Gb/s Polarization-Multiplexed 16-QAM," J. of Lightwave Technol. Vol. 28, No. 4, 547 (2010).

SUMMARY OF INVENTION

Technical Problem

In the above-described configuration, a symbol decision is initially performed on the sample inputted to the phase error calculation circuit 102 of the DDPLL 100 and the relative phase between the result of this decision and the sample is calculated as a phase error. When the Doppler shift amount in a signal modulated in binary phase shift keying (BPSK) at a symbol rate Rs is greater than a certain value (when the frequency offset is greater than a certain value), the desired result is not achieved, which is problematic.

When the frequency offset is half the symbol rate Rs (Rs/2), for example, the phase rotation amount in one symbol time due to this frequency offset is π rad. It is not possible, therefore, to distinguish the effect of the frequency offset from the effect of the symbols switching from −1 to +1 (or from +1 to −1). Thus, when the frequency offset is greater than a certain value, it is not possible to calculate the phase error by the desired symbol decision.

In other words, a DDPLL for M-phase PSK signals (M is a positive integer) does not function normally with respect to a frequency offset greater than Rs/(2M) unless the information on the frequency offset is given in advance. For this reason, the Doppler shift compensation by means of a DDPLL has a limited compensation range. The problem of limited compensation range is especially conspicuous because the symbol rates in a range of, for example, 25 GHz at a bit rate of 100 Gb/s (gigabit per second) are being studied at present for fiber-optic communication systems, but the symbol rates for optical space communication systems tend to remain slower.

Therefore, an object of the present invention is to provide a digital signal processing circuit and an optical space communication system with which the compensation range of Doppler shift compensation can be expanded.

Solution to Problem

To solve the above-described problem, an invention related to a digital signal processing circuit to decode an optical signal detected by coherent detection includes a Doppler shift compensation unit for performing Doppler shift compensation by, based on a sampling sequence signal oversampled at N times a symbol rate (N is an integer not smaller than 2) and including a center sample corresponding to a timing of a symbol center and a transition sample corresponding to a timing of a symbol transition, calculating a Doppler shift amount included in the sampling sequence signal, wherein the Doppler shift compensation unit includes a symbol decision unit to perform a symbol decision with respect to the center sample and a decision with respect to the transition sample and detects a Doppler shift amount by performing decisions while switching between the decisions for each corresponding sample and by calculating a phase error.

Further, an invention related to an optical space communication system includes: an optical front end to receive an optical signal received by the system and convert the optical signal to an electric signal and to perform meanwhile coherent detection by combining the received optical signal and a local oscillator signal; an analog-to-digital converter to convert the signal from the optical front end to a digital signal by sampling and to output the digital signal as a sampling sequence signal; and the above-described digital signal processing circuit to calculate a Doppler shift amount from the sampling sequence signal and to compensate for a Doppler shift included in the sampling sequence signal.

Advantageous Effects of Invention

The present invention enables an expansion of the range of Doppler shift compensation, compared with a DDPLL operating at 1 sample/symbol.

BRIEF DESCRIPTION OF DRAWINGS

FIG. 11 is a block diagram of a Doppler shift compensation unit according to a second example embodiment.

EXAMPLE EMBODIMENT

First Example Embodiment

Figure 1:
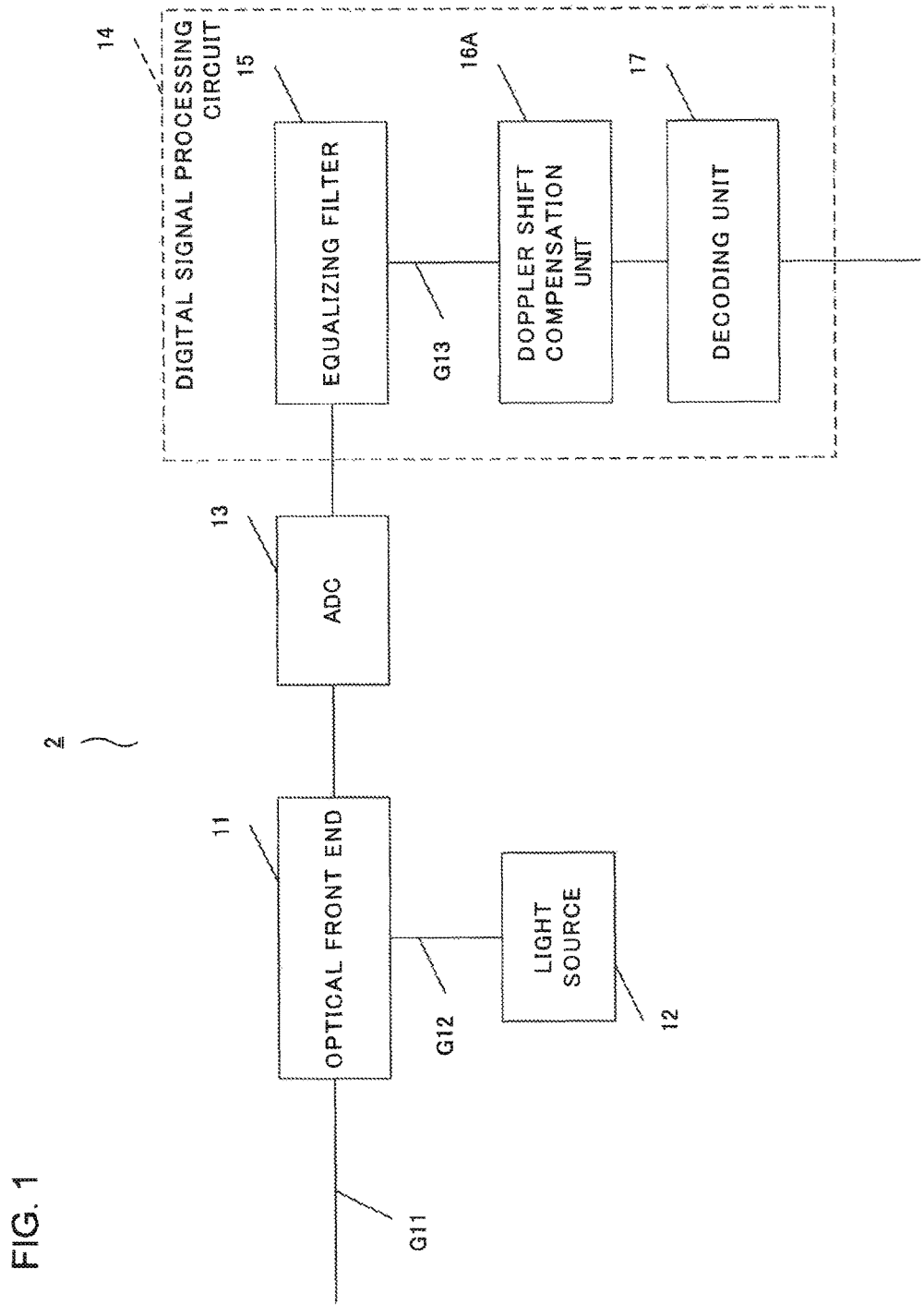
FIG. 1 is a block diagram of an optical space communication system provided with a digital signal processing circuit to compensate for a Doppler shift according to a first example embodiment.

A first example embodiment of the present invention will be described. FIG. 1 is a block diagram of an optical space communication system 2 provided with a digital signal processing circuit 14 to compensate for a Doppler shift according to the present example embodiment. Although the system will be described in the following on the assumption that the optical signal received is modulated by a BPSK method, it is not intended that the method of modulation should be limited to BPSK but it may be quadrature phase shift keying (QPSK) or the like.

The optical space communication system 2 includes an optical front end 11, a light source 12, an analog-to-digital converter (ADC) 13, and a digital signal processing circuit 14. The digital signal processing circuit 14 includes an equalizing filter 15, a Doppler shift compensation unit 16A, and a decoding unit 17.

The equalizing filter 15 performs equalizing processing on a signal. The Doppler shift compensation unit 16A performs Doppler shift compensation processing to compensate for a Doppler shift in an input signal. The decoding unit 17 performs decoding processing to decode the signal on which the Doppler shift compensation processing has been performed.

An optical signal received by the optical space communication system 2 (a received optical signal) G11 is inputted to the optical front end 11. The optical front end 11 includes known elements such as a 90 degree optical hybrid, a balanced photodetector, a transimpedance amplifier (none of these illustrated), receives the received optical signal G11 inputted thereto, which is combined with the local oscillator light G12 emitted by the light source 12, and converts the signal to an electric signal.

The output from the optical front end 11 is converted by the analog-to-digital converter (ADC) 13 into a digital signal and inputted to the digital signal processing circuit 14.

At this time, the sampling rate at the ADC 13 is set at 2 samples/symbol (i.e., oversampling at twice the symbol rate) in view of the sampling theorem to achieve an adequate effect in the processing by the equalizing filter 15 of the digital signal processing circuit 14. The equalizing filter 15 is designed to be a matched filter and compensates for waveform distortions originating from the devices or the like used in the transmitting and receiving systems. In addition, the equalizing filter 15 may perform intensity normalization, elimination of DC components, resampling for optimizing the sampling timing, and the like.

A 2-sample/symbol sampling sequence signal (hereinafter referred to as a sampling sequence) G13 from the equalizing filter 15 is inputted to the Doppler shift compensation unit 16A, which performs Doppler shift compensation. Note that the sampling sequence G13 is a signal containing a sample corresponding to the timing of a symbol center (s[i], hereinafter referred to as a center sample) and a sample corresponding to the timing of a symbol transition (t[i], hereinafter referred to as a transition sample).

The decoding unit 17 performs decoding processing such as differential decoding and forward error correction on the signal on which the Doppler shift compensation unit 16A has performed Doppler shift compensation, and the decoding unit 17 outputs the decoded signal.

Figure 2:
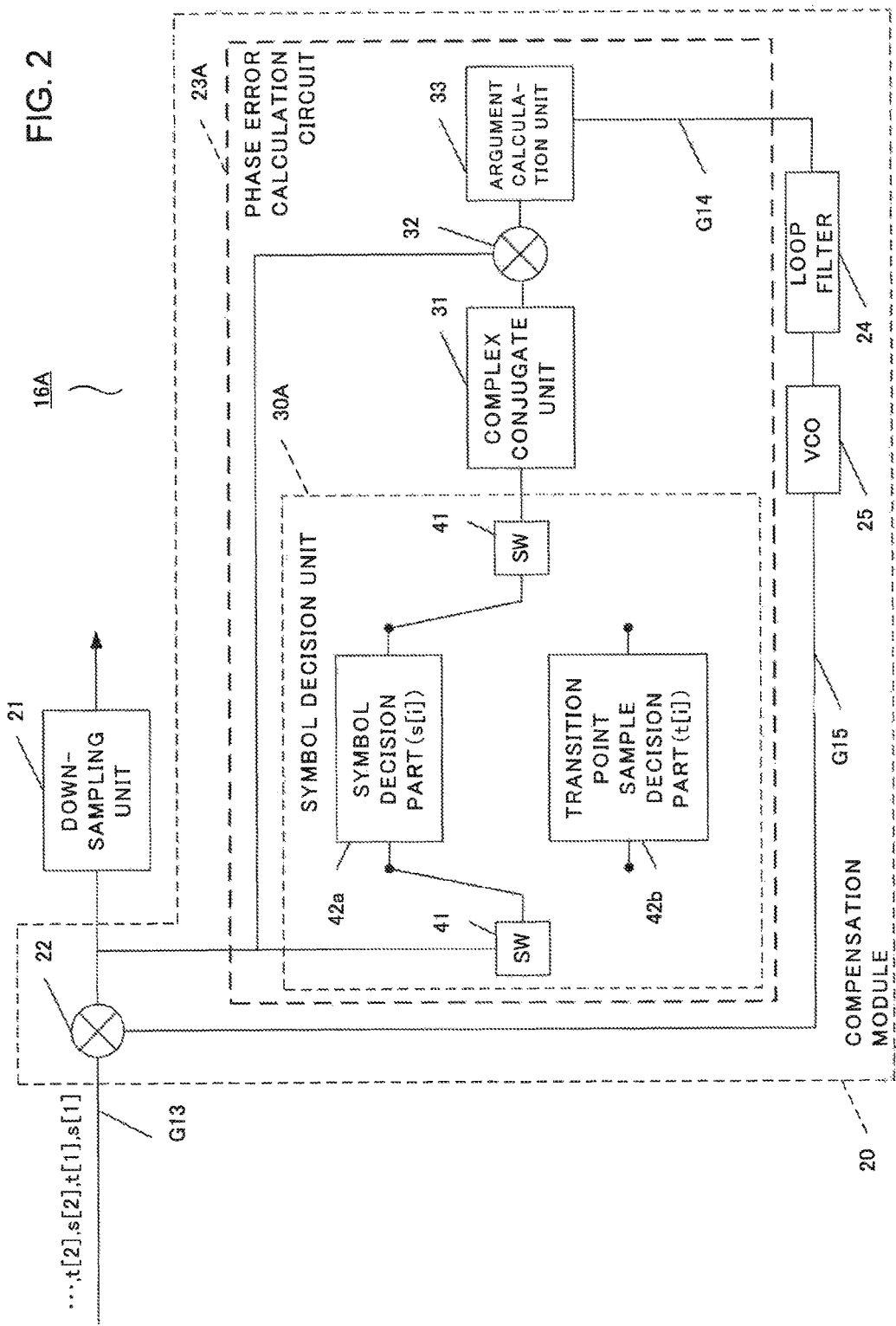
FIG. 2 is a block diagram of a Doppler shift compensation unit.

FIG. 2 is a block diagram of the Doppler shift compensation unit 16A. When the optical front end 11 is configured by using a 90-degree optical hybrid, two electric signals for the I (in-phase) component and the Q (quadrature) component are outputted by the optical front end 11. In such a case, the I-component and the Q-component are represented by a complex number and the two electric signals are depicted as one line In FIG. 2.

The Doppler shift compensation unit 16A is mainly constituted by a compensation module 20 and a downsampling unit 21. The compensation module 20 is constituted by a phase compensation device 22, a phase error calculation circuit 23A, a loop filter 24, a VCO 25, and the like and constitutes a decision-directed phase locked loop (DDPLL).

The phase error calculation circuit 23A includes a symbol decision unit 30A, a complex conjugate part 31, a multiplication device 32, and an argument calculation unit 33. The symbol decision unit 30A is constituted by a circuit switching unit (SW) 41, a symbol decision part 42a, and a transition point sample decision part 42b.

The sampling sequence G13 from the equalizing filter 15 is inputted to the phase compensation device 22 of the compensation module 20 and the output from the phase compensation device 22 is inputted to the downsampling unit 21 and the phase error calculation circuit 23A.

In other words, the compensation module 20 calculates the phase error in the sampling sequence G13 and generates a phase error signal G14.

A phase error signal G14 is generated in the following manner. The sampling sequence G13 contains center samples (s[i]) and transition samples (t[i]) as illustrated in FIG. 2.

The symbol decision part 42a is configured to perform a symbol decision with respect to a center sample s[i] and the transition point sample decision part 42b is configured to perform a symbol decision with respect to a transition sample t[i]. Therefore, it is necessary to switch between circuits to input a sample to one of the symbol decision part 42a and the transition point sample decision part 42b. This processing for switching circuits is carried out by the circuit switching part 41, which performs the switching for each sample.

Figure 3:
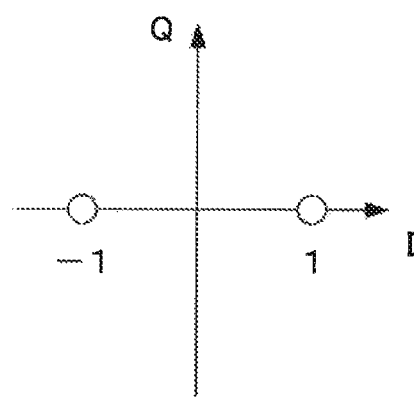
FIG. 3 is a diagram illustrating symbol candidates with respect to a sample taken in a sampling performed at the timing of a symbol center in BPSK, depicted as an image.

In the case of BPSK, the symbol decision part 42a selects a most probable candidate from between the symbol candidates of "−1" and "+1" with respect to a sample s[i] as illustrated in FIG. 3. FIG. 3 is a diagram illustrating symbol candidates with respect to a center sample in BPSK, depicted as an image. When a common least squares distance criterion is used, this symbol decision corresponds to selecting "+1" for a sample located on a quadrant on the right-hand half of the I-Q plane and selecting "−1" for a sample located on a quadrant on the left-hand half of the I-Q plane.

Figure 4:
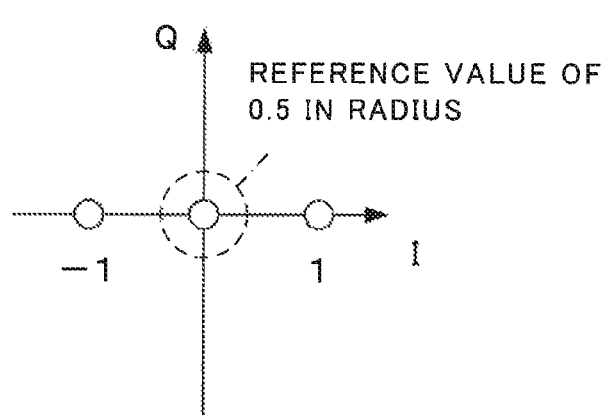
FIG. 4 is a diagram illustrating symbol candidates with respect to a sample taken in a sampling performed at the timing of a symbol transition in BPSK, depicted as an image.

In contrast, the transition point sample decision part 42b selects a most probable candidate from among the three symbol candidates (i.e., "−1", "0", and "+1") that can be ideally taken at the timing of a symbol transition with respect to a sample t[i] as illustrated in FIG. 4. FIG. 4 is a diagram illustrating symbol candidates with respect to a sample taken in a sampling performed at the timing of a symbol transition in BPSK, depicted as an image.

When a symbol transition has actually occurred, the transition sample ideally becomes "0". Hence, whether a symbol transition has occurred between the previous and subsequent symbols is determined first. More specifically, a transition is determined based on whether the sample is not greater than a reference value ("0.5" in FIG. 4). When the sample is not greater than the reference value, "0" is selected. In this case, the relative phase is not determined between the sample with respect to which the decision was made and the original sample, and the relative phase is treated as zero. This can be done by defining the value of argument to be subsequently outputted by the argument calculation unit 33 with respect to "0" as zero. When the sample is greater than the reference value, the decision is made by selecting "+1" when the I-component is positive and selecting "−1" when the I-component is negative, similarly to the symbol decision part 42a.

A most probable candidate for each sample is selected in this way and the complex conjugate unit 31 calculates a complex conjugate for the result. The calculated complex conjugate is multiplied by the original sample in the multiplication device 32 and the argument calculation unit 33 calculates the argument. This argument is outputted as a phase error signal G14.

The phase error signal G14 is inputted to the loop filter 24, which is constituted by a low-pass filter and the like, and unnecessary signals fluctuating in short cycles are suppressed in the loop filter 24. The phase error signal G14 is then inputted to the VCO 25, converted in a frequency corresponding to the amplitude of the signal, and outputted to the phase compensation device 22 as a phase compensation signal G15.

The phase compensation device 22 performs Doppler shift compensation by correcting the sampling sequence G13, based on the phase compensation signal G15.

The sampling sequence G13, on which Doppler shift compensation has been performed in this way, is downsampled to 1 sample/symbol in the downsampling unit 21 for decoding processing. This allows a 1-sample/symbol sampling sequence signal corresponding to the timing of a sample center is outputted to the decoding unit 17.

Figure 5:
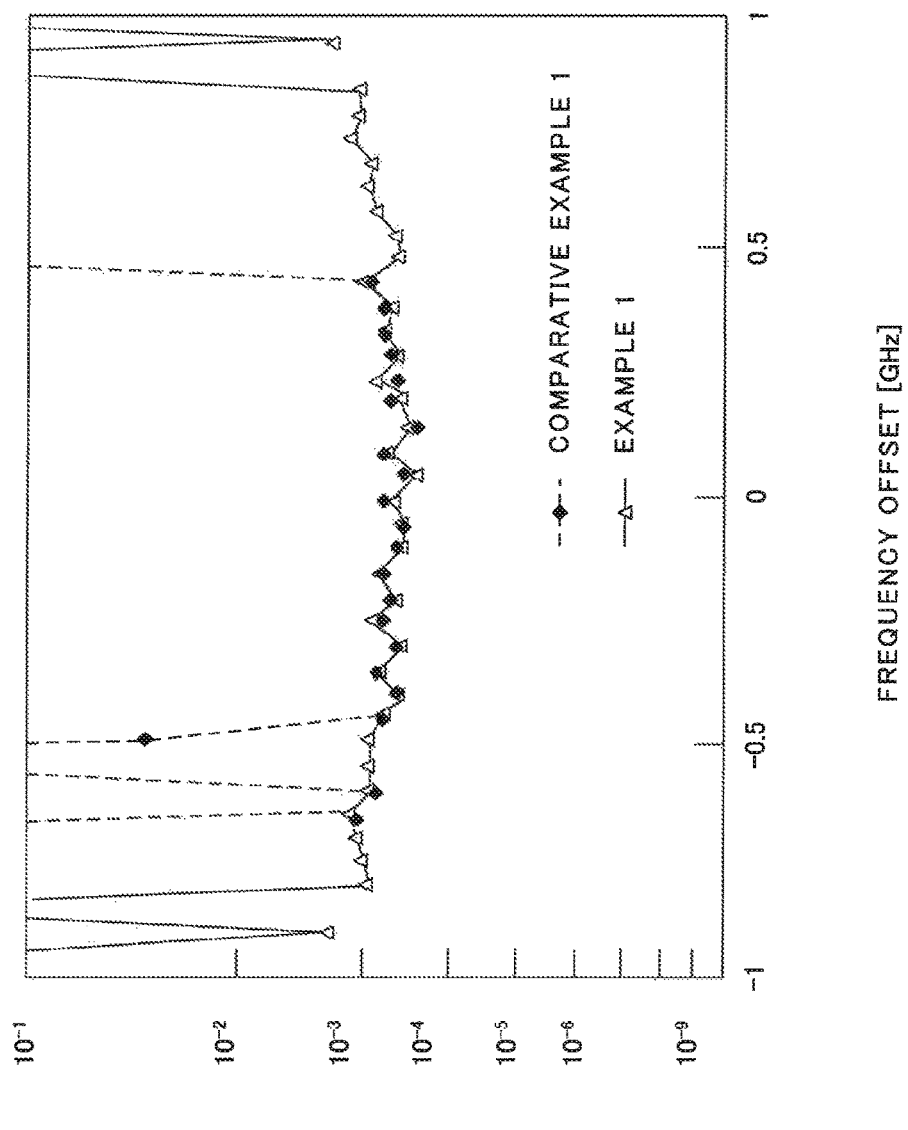
FIG. 5 illustrates a simulation result illustrating an effect of Doppler shift compensation.

FIG. 5 illustrates a simulation result illustrating the effect of Doppler shift compensation performed by the above-described method. FIG. 5 illustrates bit error rate (BER) in relation to frequency offset of a BPSK signal received at 2.5 Gb/s under the condition of the shot noise limit. In FIG. 5, "♦" signs denote the BER according to a known technique (hereinafter referred to as Comparative Example 1) and "Δ" signs denote the BER according to the above-described method (hereinafter referred to as Example 1).

The transmission data pattern is a pseudo random bit sequence (PRBS) having a length of 215-1, the analog 3 dB band of the ADC13 is 1.25 GHz, the quantum efficiency of the photodetector is 1, and the line widths of the light source on the transmission side and the local oscillator light G12 are 0. The input light intensity is −57 dBm.

For the equalizing filter 15, DC offset compensation, intensity normalization, and adaptive equalization by the constant modulus algorithm (CMA) using 5-tap T/2-spaced finite impulse response (FIR) filter were used.

In the 1-sample/symbol operation in the Comparative Example 1, the range in which the frequency offset is compensated for and the reception is made possible is within ±450 MHz. In contrast, in the case of Example 1, the range is expanded about twofold, i.e., within ±800 MHz. This is because the time intervals between phase error detections are half of those in the 1-sample/symbol operation.

Figure 6:
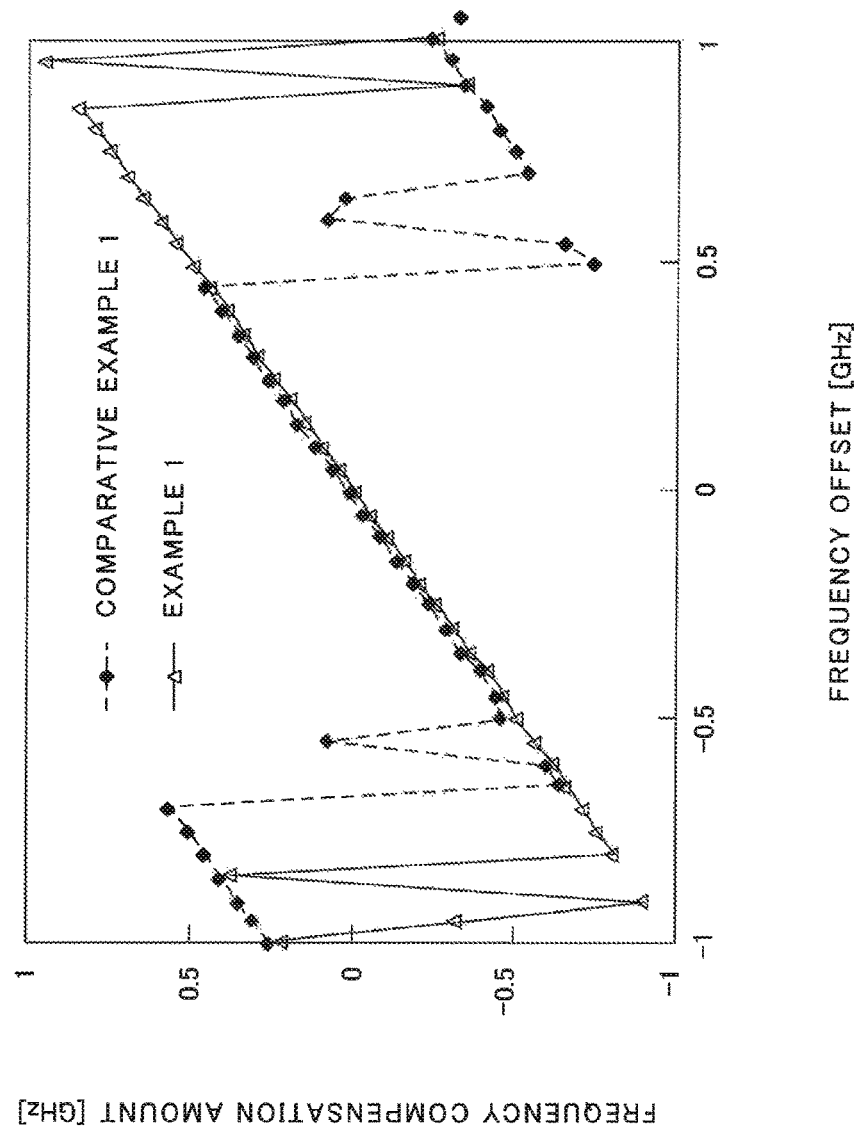
FIG. 6 illustrates frequency offset and frequency compensation amount owing to Doppler shift compensation.

FIG. 6 illustrates frequency offset and frequency compensation amount by Doppler shift compensation under the same simulation conditions. Similarly to FIG. 5, the range in which the frequency offset is equal to the frequency compensation amount in Example 1 is expanded about twofold compared with the Comparative Example 1.

Figure 7:
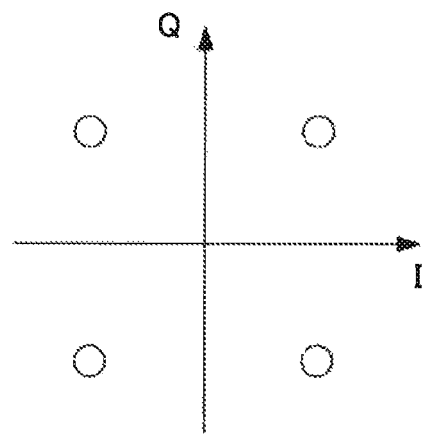
FIG. 7 is a diagram illustrating a symbol decision for a sample taken in a sampling performed at the timing of a symbol center in QPSK, depicted as an image.
Figure 8:
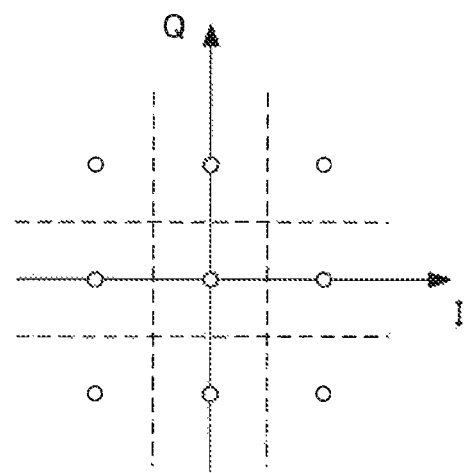
FIG. 8 is a diagram illustrating a decision for a sample taken in a sampling performed at the timing of a symbol transition in QPSK, depicted as an image.

The above-described method can be applied to the case in which the optical signal to be received is modulated by QPSK method. In such a case, the symbol candidates in the symbol decision part 42a are, as illustrated in FIG. 7, "(+1+1i)/20.5", "(+1−1i)/20.5", "(−1+1i)/20.5", and "(−1−1i)/20.5". The candidates in the transition point sample decision part 42b can be set as illustrated in FIG. 8, thereby allowing the present method to be applied. FIG. 7 is a diagram illustrating a symbol decision for a center sample in QPSK, depicted as an image. FIG. 8 is a diagram illustrating a decision for a transition sample in QPSK, depicted as an image.

Figure 9:
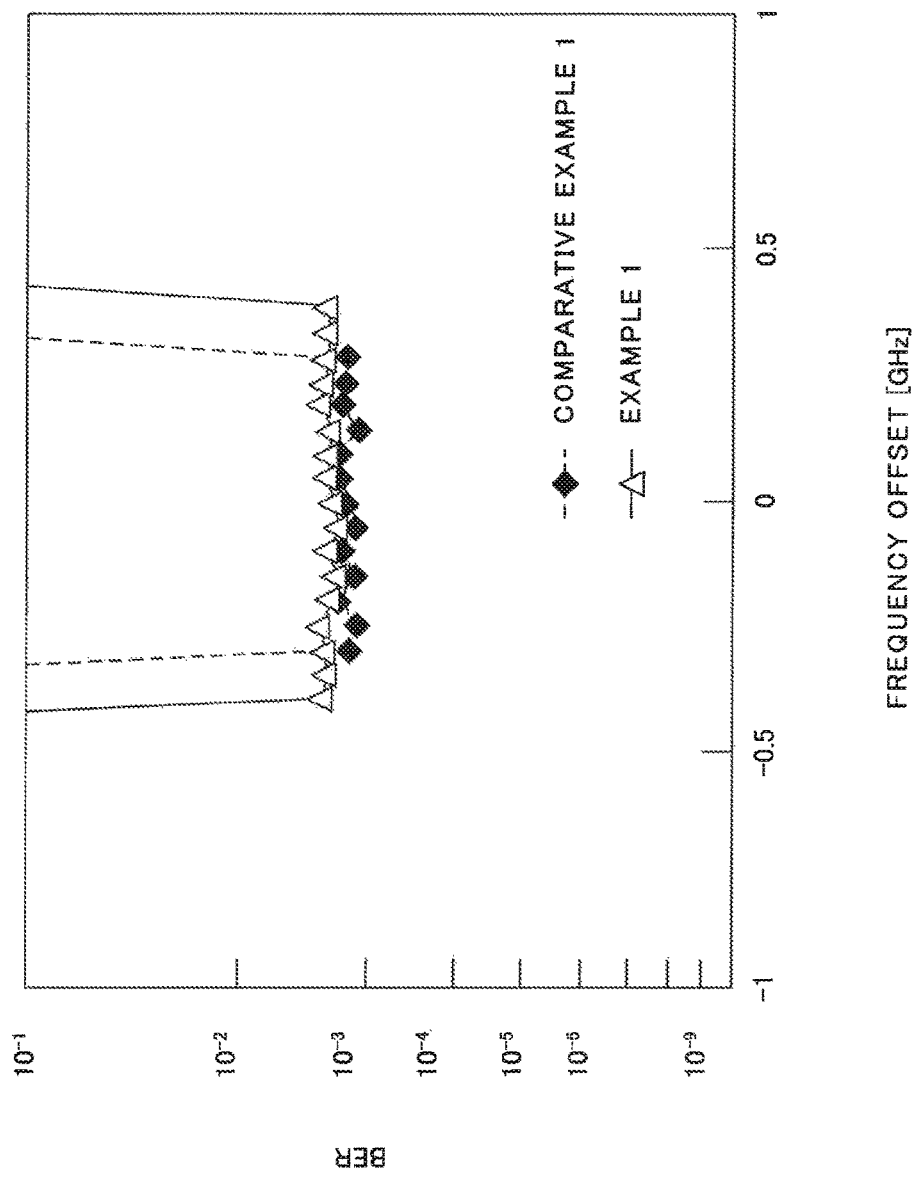
FIG. 9 illustrates a result of evaluation by a simulation of BER in receiving QPSK signals at 5 Gb/s under the condition of the shot noise limit, for various frequency offsets.

FIG. 9 illustrates a result of evaluation by a simulation of BER in receiving QPSK signals at 5 Gb/s under the condition of the shot noise limit, for various frequency offsets. To avoid a discontinuity in the phase offset, called a cycle slip, a differential coding was applied and the receiving light intensity was −54 dBm.

It can be seen that the compensation range is within ±300 MHz in the 1-sample/symbol operation in Comparative Example 1 while the range is expanded to ±400 MHz in Example 1.

A comparison within the compensation range of the 1-sample/symbol operation of Comparative Example 1 indicates a slight BER deterioration when the method according to the present example embodiment is applied. This is presumably because the distances between the decision candidates for the transition point sample decision part 42b, sampled at the timing of a symbol transition, are smaller than the distances between the symbol candidates for the symbol decision part 42a, sampled at the timing of a symbol center, and errors are more likely to occur.

Figure 10:
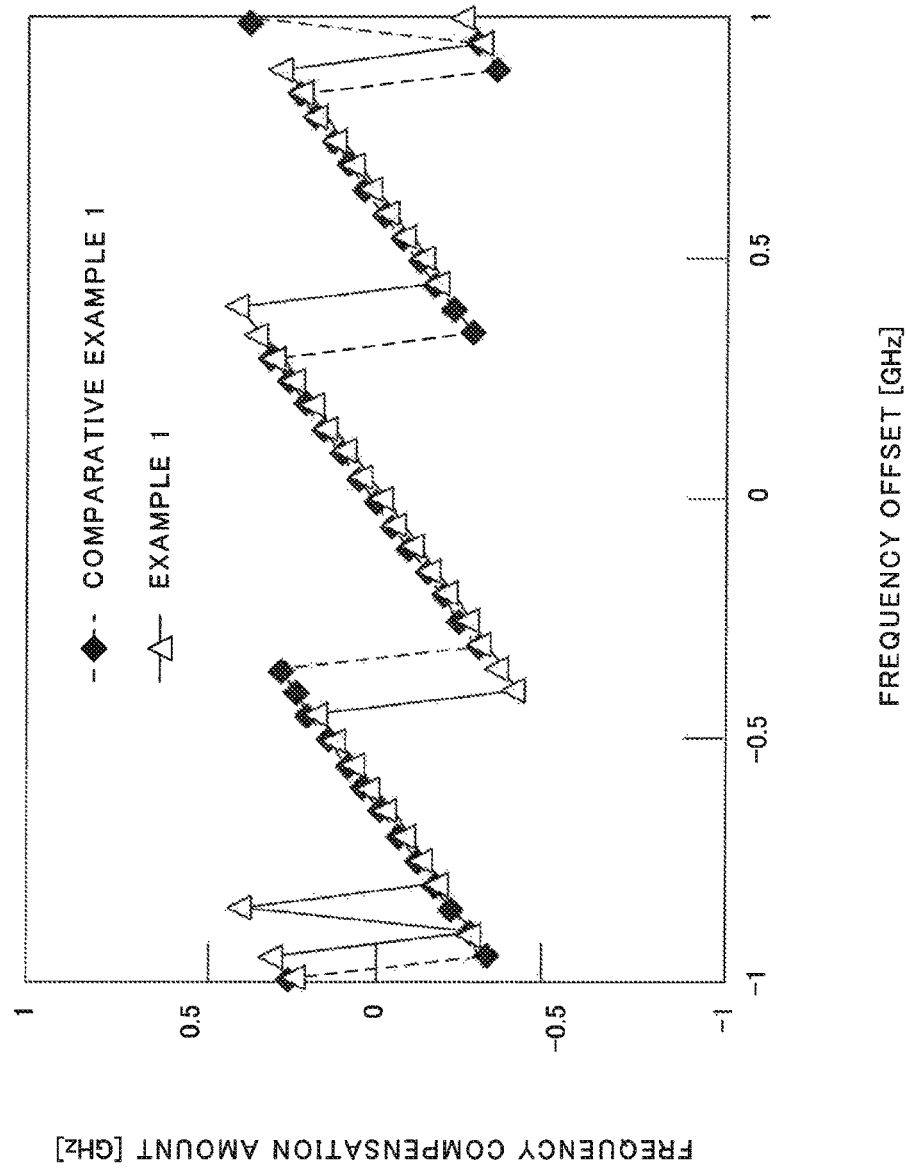
FIG. 10 illustrates a result of plotting frequency offset and frequency compensation amount by Doppler shift compensation.

FIG. 10 illustrates a result of plotting the frequency offset and the frequency compensation amount by Doppler shift compensation under the same simulation conditions. It is observed here also that in the application of the method according to the present example embodiment the range in which the frequency offset is equal to the frequency compensation amount.

As described above, the range of Doppler shift compensation was successfully expanded by carrying out symbol decisions separately by the symbol decision part and the transition point sample decision part, based on 2-sample/symbol operation as opposed to the 1-sample/symbol operation.

Second Example Embodiment

Next, a second example embodiment according to the present invention will be described. The same features as in the first example embodiment will be denoted by the same reference signs and, where appropriate, will not be described in further detail.

Figure 11:
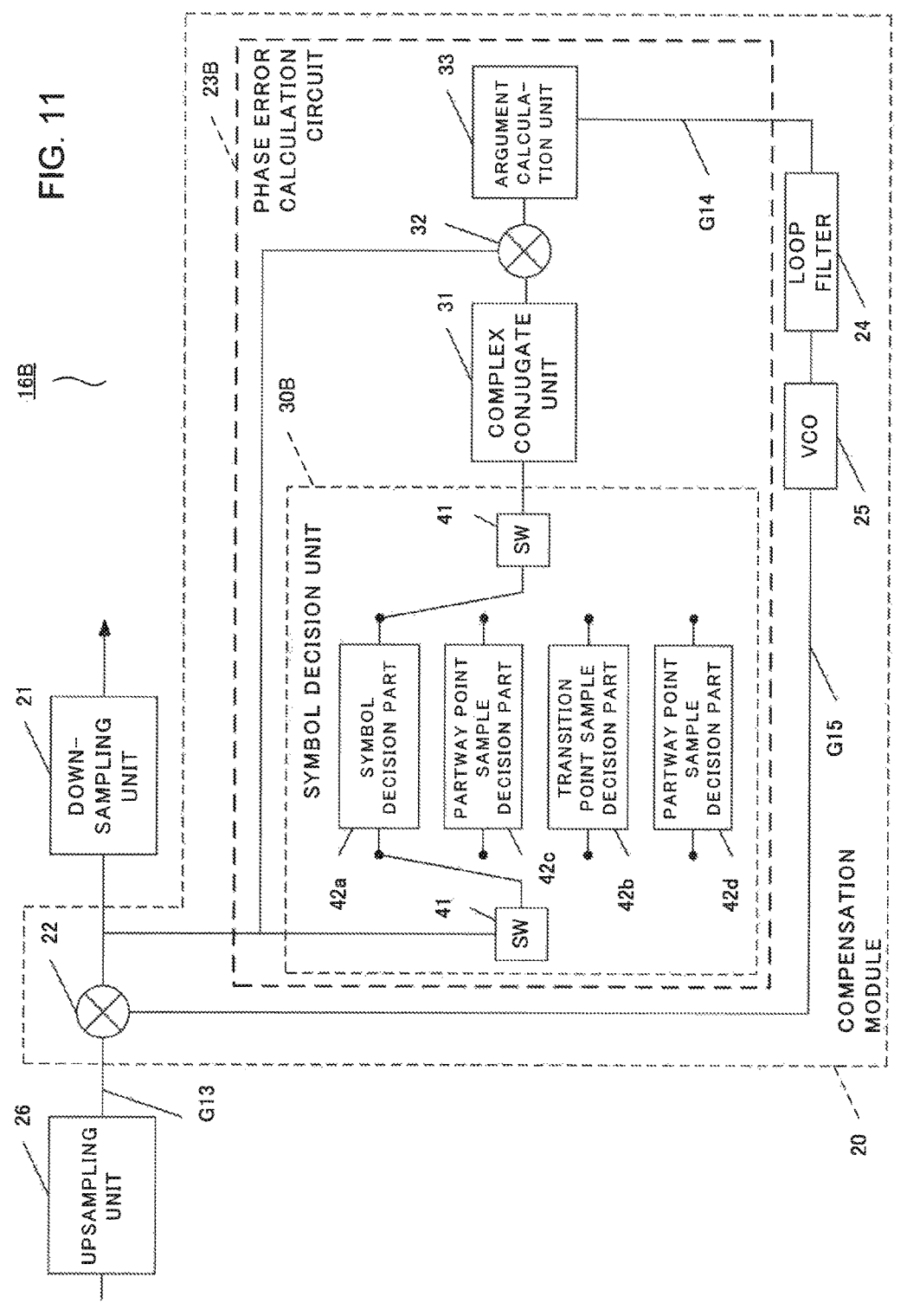

FIG. 11 is a block diagram of a Doppler shift compensation unit 16B according to the present example embodiment. The Doppler shift compensation unit 16B according to the present example embodiment additionally includes an upsampling unit 26 and differs in the configuration of the symbol decision unit from the Doppler shift compensation unit 16A according to the first example embodiment as illustrated in FIG. 2. Upsampling need not be carried out in the digital region as illustrated and the same operation can be achieved by changing the sampling rate of the ADC 13 instead.

More specifically, compared with the symbol decision unit 30A, the symbol decision unit 30B, which corresponds to the symbol decision unit 30A, additionally includes a plurality of partway point sample decision parts 42c, 42d. The other elements are the same.

An inputted signal is upsampled in the upsampling unit 26, for example, to 4 samples/symbol and inputted to the phase compensation device 22 as a sampling sequence G13. This output from the phase compensation device 22 is inputted to the downsampling unit 21 and the phase error calculation circuit 23B. The phase error calculation circuit 23B consecutively generates a phase error signal G14 and a phase compensation signal G15. The phase compensation device 22 performs Doppler shift compensation on the sampling sequence G13 from the upsampling unit 26, based on the phase compensation signal G15. The downsampling unit 21 downsamples the signal on which Doppler shift compensation has been performed to 1 sample/symbol and outputs the downsampled signal.

The symbol decision part 42a of the symbol decision unit 30B performs symbol decisions on the samples taken at the timing of a symbol center. The transition point sample decision part 42b performs symbol decisions on the samples taken partway, at the timing of a symbol transition. The partway point sample decision parts 42c, 42d perform symbol decisions on the samples taken at the timing partway during a symbol transition. When it is known somehow that the sampling sequence G13 has a temporal symmetry, one of the partway point sample decision parts may be omitted and the functions of the partway point sample decision parts 42c, 42d can be realized by one part.

The circuit switching unit 41 performs switching for every sample contained in the sampling sequence G13 and switches between the circuits in such a way that the signal is outputted to the symbol decision part 42a, the partway point sample decision part 42c, the transition point sample decision part 42b, the partway point sample decision part 42d, the symbol decision part 42a, . . . .

Figure 12:
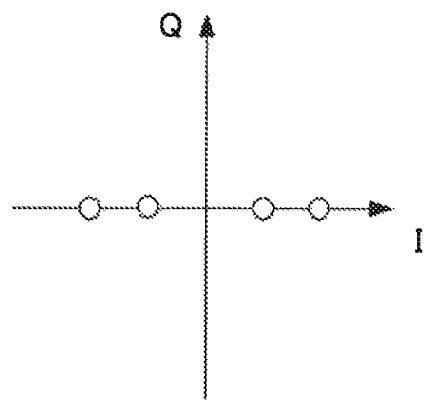
FIG. 12 is a diagram illustrating a decision for a sample taken in a sampling performed at the timing of a partway between a symbol center and a symbol transition in BPSK, depicted as an image.

The symbol candidates for the partway point sample decision parts 42c, 42d can be calculated in advance based on the modulation method, the way of transition of the signal, and the like. For example, the partway point sample candidates in BPSK with 4-sample/symbol upsampling are points on the I-axis as illustrated in FIG. 12. The calculation of relative phase to the original sample does not require information on the amplitude; hence it is possible to use the same symbol candidates as the symbol candidates sampled at the timing of a symbol center as illustrated in FIG. 3 and, in this case, the functions of the partway point sample decision parts 42c, 42d and also the symbol decision part 42a can be realized by one part.

Figure 13:
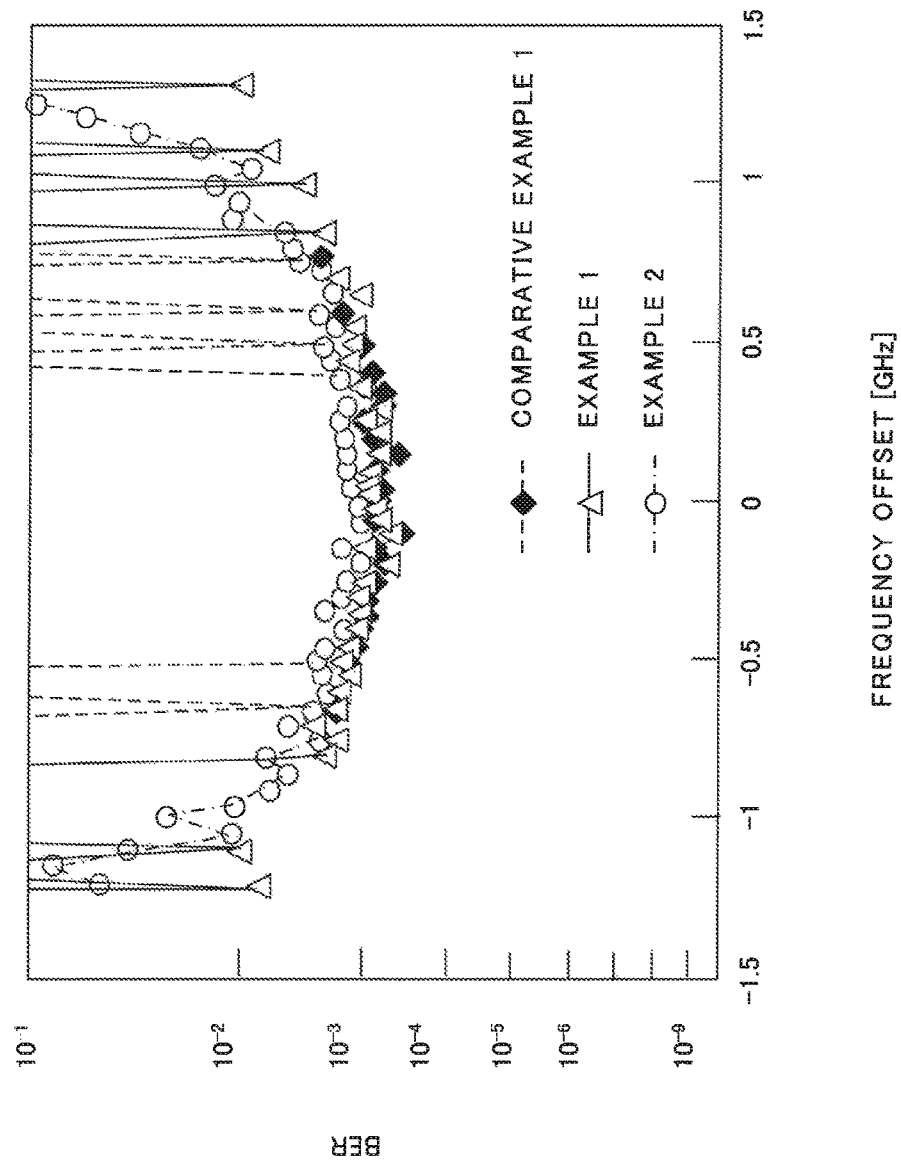
FIG. 13 illustrates a result of a simulation of bit error rate in relation to frequency offset in receiving BPSK signals at 2.5 Gb/s under the condition of the shot noise limit.
Figure 14:
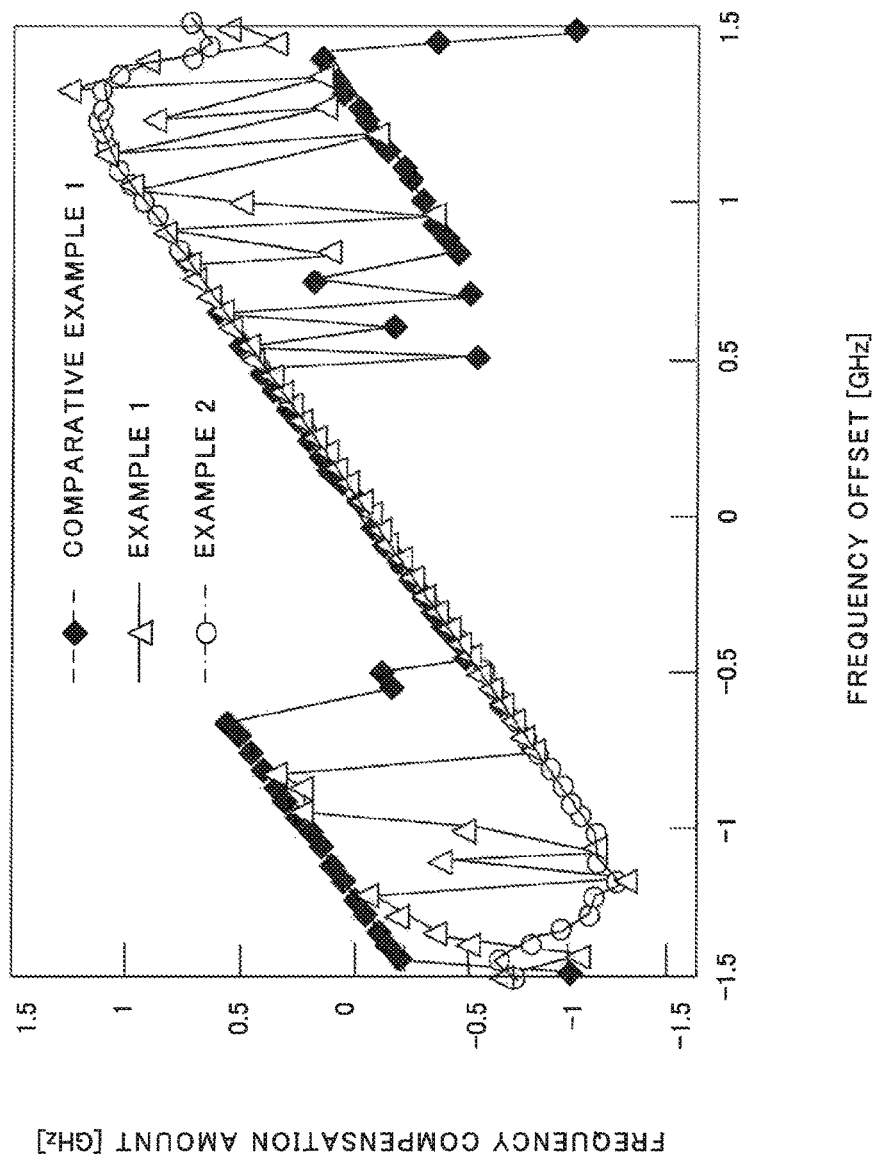
FIG. 14 is a result of illustrating frequency offset and frequency compensation amount by Doppler shift compensation.

FIG. 13 illustrates a result of a simulation of bit error rate (BER) in relation to frequency offset in receiving BPSK signals at 2.5 Gb/s under the condition of the shot noise limit. FIG. 14 is a result of illustrating frequency offset and frequency compensation amount by Doppler shift compensation.

In this simulation, a differential coding was applied to reduce cycle slips. In FIGS. 13 and 14, "♦" signs denote the BER according to a known technique described in relation to the first example embodiment (hereinafter referred to as Comparative Example 1) and, similarly, "Δ" signs denote the BER according to the above-described method (hereinafter referred to as Example 1). In contrast, "○" signs denote the BER with the configuration according to the present example embodiment with up sampling to 4 samples/symbol (hereinafter referred to as Example 2).

In the case of Example 2, the range in which the frequency offset is equal to the frequency compensation amount is expanded to approximately ±1 GHz. It is observed that BER deteriorates in the ranges close to frequency offsets of ±1 GHz, which is because, with frequency offsets of ±1 GHz, a significant portion of the analog signal is out of the band of the ADC 13. To avoid this, the frequency of the local oscillator light G12 needs to be controlled.

As described above, the range of Doppler shift compensation can be further expanded by providing an upsampling unit to upsample the input signal and carrying out a symbol decision for each sample by means of the symbol decision unit, the transition point sample decision unit, and the partway point sample decision units.

Third Example Embodiment

Next, a third example embodiment of the present invention will be described. The same features as in the first and second example embodiments will be denoted by the same reference signs and, where appropriate, will not be described in further detail.

Figure 15:
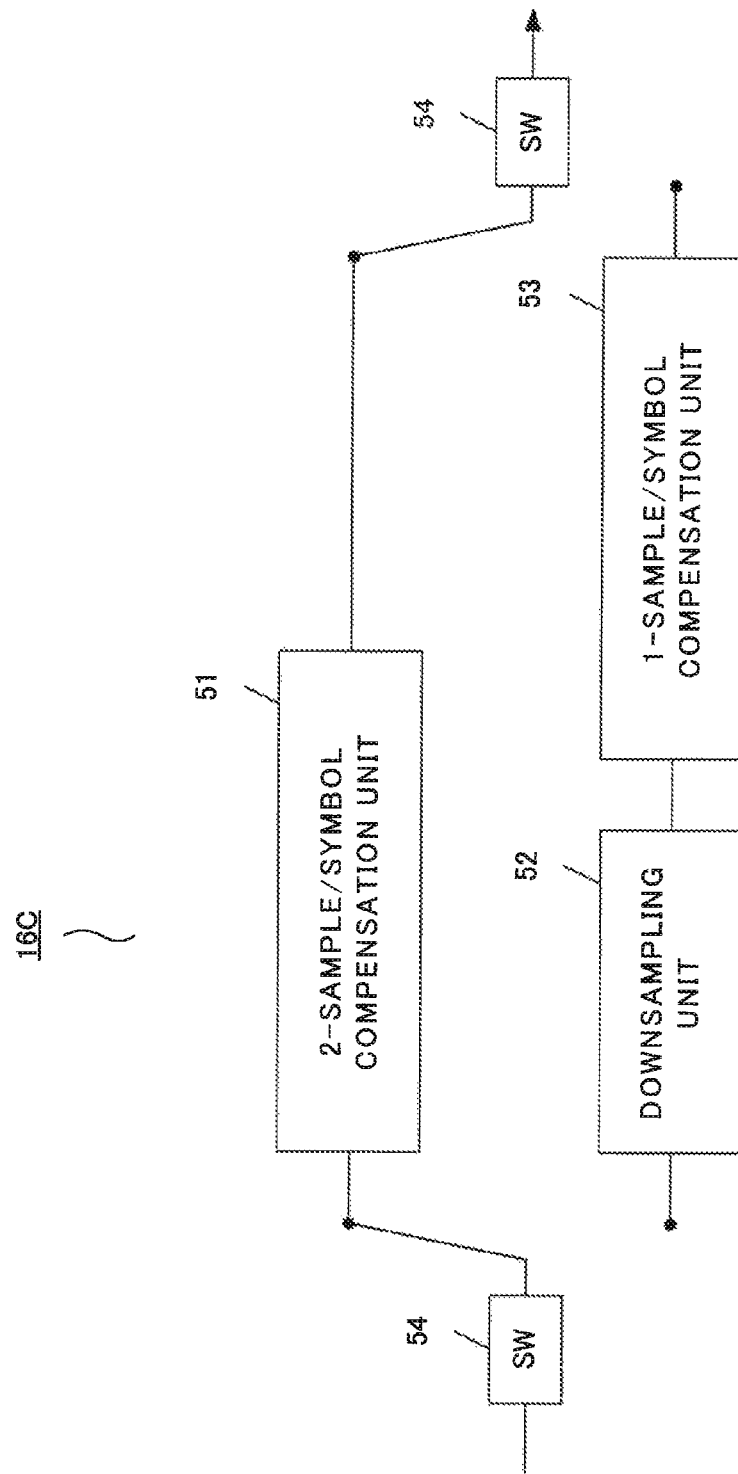
FIG. 15 is a block diagram of a Doppler shift compensation unit according to a third example embodiment.

FIG. 15 is block diagram of a Doppler shift compensation unit 16C according to the present example embodiment. The Doppler shift compensation unit 16C includes a 2-sample/symbol compensation unit 51, a downsampling unit 52, a 1-sample/symbol compensation unit 53, and a switching circuit 54.

Figure 16:
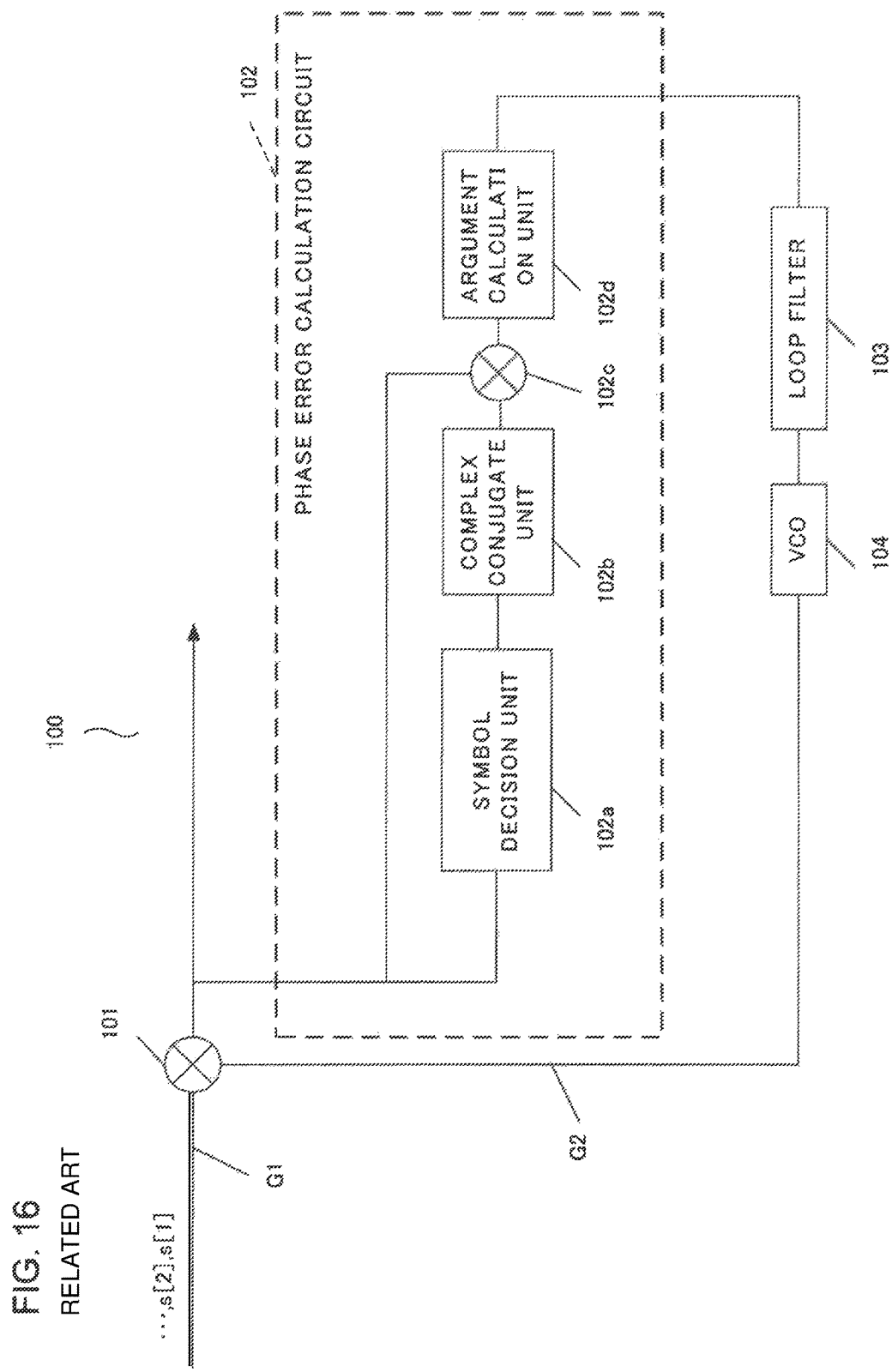
FIG. 16 is a block diagram of a common DDPLL for describing a related art.

The 2-sample/symbol compensation unit 51 is configured in the same way as the Doppler shift compensation unit 16A described in the first example embodiment. The 1-sample/symbol compensation unit 53 is configured in the same way as the known Doppler shift compensation unit illustrated in FIG. 16.

The Doppler shift compensation unit described in the first example embodiment and elsewhere achieved a wide compensation range. On the other hand, it requires the use of samples taken at the timing of a symbol transition, which allows for only short distances between the decision candidates. This increases the possibility of decision errors and the risk of deteriorating BER and increasing cycle slips. In addition, more calculation resources are required for the 2-sample/symbol operation.

To address this, in the present example embodiment, a 2-sample/symbol sampling sequence is inputted to the 2-sample/symbol compensation unit 51. The 2-sample/symbol compensation unit 51 performs a pull-in (synchronization) of the compensation frequency and, after the completion of the pull-in, the switching circuit 54 switches between circuits. This switching between the circuits allows the signal to be downsampled in the downsampling unit 52 and to be inputted to the 1-sample/symbol compensation unit 53. When this switching between the circuits is performed, the frequency compensation amount after the pull-in is transmitted to the 1-sample/symbol compensation unit 53 (for example, by setting the initial input value of the VCO 104 for deciding the frequency compensation amount in such a way that the frequency compensation amount is equal to the frequency compensation amount of the 2-sample/symbol compensation unit 51 after the pull-in) and the 1-sample/symbol compensation unit 53 starts to operate.

Such processing enables a wide compensation range and good BER characteristics to be achieved at the same time. Whether the frequency pull-in has been completed can be determined by comparing statistical characteristics of the samples after compensation with those of an ideal signal or by checking whether a certain training pattern inserted in advance on the transmitter side has been properly recognized.

The present invention has been described above referring to example embodiments (and examples) but the present invention is not limited to the above-described example embodiments (and examples). Various modifications that a person skilled in the art can understand can be made to the present invention without departing from the scope of the present invention.

REFERENCE SIGNS LIST 2 optical space communication system
11 optical front end
12 light source
14 digital signal processing circuit
15 equalizing filter
16 (16A to 16C) Doppler shift compensation unit
17 decoding unit
20 compensation module
21 downsampling unit
22 phase compensation device
23A phase error calculation circuit
23B phase error calculation circuit
24 loop filter 26 upsampling unit
30A to 30C symbol decision unit
31 complex conjugate unit
32 multiplication device
33 argument calculation unit
41, 43 circuit switching unit
42a symbol decision part
42b transition point sample decision part
42c, 42d partway point sample decision part
45 downsampling unit

The invention claimed is:

1. A digital signal processing circuit to decode an optical signal detected by coherent detection, the digital signal processing circuit comprising:
   a Doppler shift compensation circuit configured to perform Doppler shift compensation by, based on a sampling sequence signal oversampled at N times a symbol rate (N is an integer not smaller than 2) and including a center sample corresponding to a timing of a symbol center and a transition sample corresponding to a timing of a symbol transition, calculate a Doppler shift amount included in the sampling sequence signal,
   wherein the Doppler shift compensation circuit includes a symbol decision circuit configured to perform a symbol decision with respect to the center sample and a symbol decision with respect to the transition sample and detects a Doppler shift amount by performing decisions while switching between the decisions for each corresponding sample and by calculating a phase error.

2. The digital signal processing circuit according to claim 1,
   wherein the sampling sequence signal further includes a partway point sample corresponding to a timing partway between the timing of a symbol center and the timing of a symbol transition, and
   wherein the Doppler shift compensation circuit includes the symbol decision circuit configured to perform a symbol decision with respect to the center sample, a decision with respect to the transition sample, and a decision with respect to the partway point sample and detects a Doppler shift amount by performing decisions while switching between the decisions for each corresponding sample and by calculating a phase error.

3. An optical space communication system comprising:
   an optical front end to receive an optical signal received by the system and convert the optical signal to an electric signal and to perform meanwhile a coherent detection by combining the received optical signal and a local oscillator signal;
   an analog-to-digital converter to convert the signal from the optical front end to a digital signal by sampling and to output the digital signal as a sampling sequence signal; and
   a digital signal processing circuit according to claim 2 configured to calculate a Doppler shift amount from the sampling sequence signal and to compensate for a Doppler shift included in the sampling sequence signal.

4. The digital signal processing circuit according to claim 1, further comprising an upsampling circuit,
   wherein the symbol decision circuit comprises:
   a symbol decision part configured to perform a symbol decision with respect to the center sample;
   a transition point sample decision part configured to performing a decision with respect to the transition sample;
   a partway point sample decision part configured to perform a decision with respect to a partway point sample sampled by the upsampling circuit; and
   a circuit switch configured to switch between circuits for each sample in such a way that the center sample included in the sampling sequence signal is inputted to the symbol decision part, that the transition sample is inputted to the transition point sample decision part, and that the partway point sample is inputted to the partway point sample decision part.

5. An optical space communication system comprising:
   an optical front end to receive an optical signal received by the system and convert the optical signal to an electric signal and to perform meanwhile a coherent detection by combining the received optical signal and a local oscillator signal;
   an analog-to-digital converter to convert the signal from the optical front end to a digital signal by sampling and to output the digital signal as a sampling sequence signal; and
   a digital signal processing circuit according to claim 4 configured to calculate a Doppler shift amount from the sampling sequence signal and to compensate for a Doppler shift included in the sampling sequence signal.

6. The digital signal processing circuit according to claim 1,
   wherein the Doppler shift compensation circuit comprises:
   an N-sample/symbol compensation circuit configured to pull in a compensation frequency, based on the sampling sequence signal including the center sample and the transition sample;
   a downsampling circuit configured to downsample the sampling sequence signal;
   a 1-sample/symbol compensation circuit for which a compensation frequency obtained by pulling in a Doppler shift amount included in a signal from the downsampling circuit by the N-sample/symbol compensation circuit is set as an initial value; and
   a switching circuit to allow the sampling sequence signal to be inputted to the N-sample/symbol compensation circuit and, after the compensation frequency is pulled in, to be inputted to the 1-sample/symbol compensation circuit via the downsampling circuit, to take out an output from the 1-sample/symbol compensation circuit.

7. An optical space communication system comprising:
   an optical front end to receive an optical signal received by the system and convert the optical signal to an electric signal and to perform meanwhile a coherent detection by combining the received optical signal and a local oscillator signal;
   an analog-to-digital converter to convert the signal from the optical front end to a digital signal by sampling and to output the digital signal as a sampling sequence signal; and
   a digital signal processing circuit according to claim 6 configured to calculate a Doppler shift amount from the sampling sequence signal and to compensate for a Doppler shift included in the sampling sequence signal.

8. An optical space communication system comprising:
   an optical front end to receive an optical signal received by the system and convert the optical signal to an electric signal and to perform meanwhile a coherent detection by combining the received optical signal and a local oscillator signal;

an analog-to-digital converter to convert the signal from the optical front end to a digital signal by sampling and to output the digital signal as a sampling sequence signal; and a digital signal processing circuit according to claim 1 configured to calculate a Doppler shift amount from the sampling sequence signal and to compensate for a Doppler shift included in the sampling sequence signal.

9. A signal processing method for decoding an optical signal detected by coherent detection, the method comprising:

Performing, by a Doppler shift compensation circuit, Doppler shift compensation by, based on a sampling sequence signal oversampled at N times a symbol rate (N is an integer not smaller than 2) and including a center sample corresponding to a timing of a symbol center and a transition sample corresponding to a timing of a symbol transition, calculating, by a Doppler shift compensation circuit, a Doppler shift amount included in the sampling sequence signal, wherein the Doppler shift compensation includes performing, by a symbol decision circuit, a symbol decision with respect to the center sample and a symbol decision with respect to the transition sample and detecting a Doppler shift amount by performing decisions while switching between the decisions for each corresponding sample and by calculating a phase error.

* * * * *